US010612808B2

(12) United States Patent
Joy et al.

(10) Patent No.: US 10,612,808 B2
(45) Date of Patent: Apr. 7, 2020

(54) OPERATING AN HVAC SYSTEM BASED ON PREDICTED INDOOR AIR TEMPERATURE

(71) Applicant: LENNOX INDUSTRIES INC., Richardson, TX (US)

(72) Inventors: Jeeson Kangirathingal Joy, Bengaluru (IN); Santhosh Kumar Selvam, Palakkad (IN); Rohini Brahme, Irving, TX (US)

(73) Assignee: Lennox Industries Inc., Richardson, TX (US)

(*) Notice: Subject to any disclaimer, the term of this patent is extended or adjusted under 35 U.S.C. 154(b) by 59 days.

(21) Appl. No.: 15/967,848

(22) Filed: May 1, 2018

(65) Prior Publication Data

US 2019/0338978 A1   Nov. 7, 2019

(51) Int. Cl.

| F24F 11/86 | (2018.01) |
|---|---|
| F24F 11/65 | (2018.01) |
| G05B 13/02 | (2006.01) |
| F24F 11/64 | (2018.01) |
| F24F 11/46 | (2018.01) |
| F24F 110/20 | (2018.01) |
| F24F 140/50 | (2018.01) |
| F24F 140/60 | (2018.01) |
| F24F 110/10 | (2018.01) |

(52) U.S. Cl.
CPC ............ *F24F 11/65* (2018.01); *F24F 11/64* (2018.01); *G05B 13/026* (2013.01); *F24F 11/46* (2018.01); *F24F 2110/10* (2018.01); *F24F 2110/20* (2018.01); *F24F 2140/50* (2018.01); *F24F 2140/60* (2018.01)

(58) Field of Classification Search
CPC .................. F24F 700/276; F24F 11/0086
USPC ........................................... 700/276
See application file for complete search history.

(56) References Cited

U.S. PATENT DOCUMENTS

| 8,600,561 B1* | 12/2013 | Modi ................... G05D 23/19 |
| | | 700/276 |
| 2007/0200004 A1* | 8/2007 | Kasper ................. F24F 11/30 |
| | | 236/44 C |
| 2010/0288468 A1* | 11/2010 | Patel ................... B01D 46/10 |
| | | 165/59 |
| 2014/0091153 A1* | 4/2014 | Stefanski ........... G05D 23/1917 |
| | | 236/1 C |
| 2014/0277761 A1* | 9/2014 | Matsuoka .......... G05D 23/1904 |
| | | 700/276 |
| 2014/0365017 A1* | 12/2014 | Hanna ................. F24F 11/30 |
| | | 700/276 |

(Continued)

*Primary Examiner* — Suresh Suryawanshi
(74) *Attorney, Agent, or Firm* — Baker Botts L.L.P.

(57) ABSTRACT

A method includes receiving a setpoint and a time of interest indicating a time in the future when the setpoint is to be reached and obtaining a first data set comprising a plurality of lag values, the plurality of lag values associated with one or more variables related to the HVAC system. The method further includes selecting a second data set comprising a subset of the lag values from the first data set and determining a predicted condition at the time of interest based at least in part on the lag values in the second data set. The method further includes determining a schedule for operating heating or cooling components of the HVAC system such that the setpoint is reached by the time of interest and communicating one or more signals instructing the HVAC system to operate according to the schedule.

20 Claims, 4 Drawing Sheets

(56) References Cited

U.S. PATENT DOCUMENTS

| | | | |
|---|---|---|---|
| 2015/0276495 A1* | 10/2015 | Smullin | G01K 3/04 |
| | | | 702/130 |
| 2016/0054019 A1* | 2/2016 | Lee | F24F 11/30 |
| | | | 700/276 |
| 2016/0291561 A1* | 10/2016 | Al-Mohssen | G05F 1/66 |
| 2016/0323151 A1* | 11/2016 | Nahata | H04L 41/147 |
| 2018/0031260 A1* | 2/2018 | Bernborn | G05D 23/1905 |
| 2018/0142915 A1* | 5/2018 | Mady | F24F 11/64 |
| 2018/0313557 A1* | 11/2018 | Turney | G05D 23/1904 |

* cited by examiner

| Variable | Lag Time 1 | Lag Time 2 | Lag Time 3 | Lag Time 4 | Lag Time n |
|---|---|---|---|---|---|
| A | $V_{A1}$ | $V_{A2}$ | $V_{A3}$ | $V_{A4}$ | $V_{An}$ |
| B | $V_{B1}$ | $V_{B2}$ | $V_{B3}$ | $V_{B4}$ | $V_{Bn}$ |
| C | $V_{C1}$ | $V_{C2}$ | $V_{C3}$ | $V_{C4}$ | $V_{Cn}$ |
| D | $V_{D1}$ | $V_{D2}$ | $V_{D3}$ | $V_{D4}$ | $V_{Dn}$ |
| E | $V_{E1}$ | $V_{E2}$ | $V_{E3}$ | $V_{E4}$ | $V_{En}$ |

225

235

| Variable | Lag Time 1 | Lag Time 2 | Lag Time 3 |
|---|---|---|---|
| A | $V_{A1}$ | $V_{A2}$ | $V_{A3}$ |
| B | $V_{B1}$ | $V_{B2}$ | $V_{B3}$ |
| C | $V_{C1}$ | $V_{C2}$ | $V_{C3}$ |
| D | $V_{D1}$ | $V_{D2}$ | $V_{D3}$ |
| E | $V_{E1}$ | $V_{E2}$ | $V_{E3}$ |

245

| Variable | Lag Time 1 | Lag Time 2 | Lag Time 3 |
|---|---|---|---|
| A | $VAR_{A1}$ | $VAR_{A2}$ | $VAR_{A3}$ |
| B | $VAR_{B1}$ | $VAR_{B2}$ | $VAR_{B3}$ |
| C | $VAR_{C1}$ | $VAR_{C2}$ | $VAR_{C3}$ |
| D | $VAR_{D1}$ | $VAR_{D2}$ | $VAR_{D3}$ |
| E | $VAR_{E1}$ | $VAR_{E2}$ | $VAR_{E3}$ |

255

| Variable | Lag Time 1 | Lag Time 2 | Lag Time 3 |
|---|---|---|---|
| A | $VAR_{A1} > VAR_T$ | $VAR_{A2} < VAR_T$ | $VAR_{A3} < VAR_T$ |
| B | $VAR_{B1} < VAR_T$ | $VAR_{B2} > VAR_T$ | $VAR_{B3} < VAR_T$ |
| C | $VAR_{C1} < VAR_T$ | $VAR_{C2} < VAR_T$ | $VAR_{C3} < VAR_T$ |
| D | $VAR_{D1} > VAR_T$ | $VAR_{D2} < VAR_T$ | $VAR_{D3} < VAR_T$ |
| E | $VAR_{E1} < VAR_T$ | $VAR_{E2} < VAR_T$ | $VAR_{E3} > VAR_T$ |

265

| Variable | Lag Time 1 | Lag Time 2 | Lag Time 3 |
|---|---|---|---|
| A | Removed | A2 | A3 |
| B | B1 | Removed | B3 |
| C | C1 | C2 | C3 |
| D | Removed | D2 | D3 |
| E | E1 | E2 | Removed |

OPERATING AN HVAC SYSTEM BASED ON PREDICTED INDOOR AIR TEMPERATURE

TECHNICAL FIELD

This disclosure relates generally to operating a heating, ventilation, and air conditioning ("HVAC") system. More specifically, this disclosure relates to a system and method of operating an HVAC system based on a predicted indoor air temperature.

BACKGROUND

Heating, ventilation, and air conditioning ("HVAC") systems can be used to regulate the environment within an enclosed space. Typically, an air blower is used to pull air from the enclosed space into the HVAC system through ducts and push the air back into the enclosed space through additional ducts after conditioning the air (e.g., heating, cooling or dehumidifying the air). Various types of HVAC systems, such as residential and commercial, may be used to provide conditioned air for enclosed spaces.

Each HVAC system typically includes a HVAC controller that directs the operation of the HVAC system. The HVAC controller can direct the operation of a conditioning unit, such as an air conditioner or a heater, to control the temperature of the enclosed space.

SUMMARY OF THE DISCLOSURE

According to one embodiment, a controller for a heating, ventilation, and air condition ("HVAC") system, the controller comprising processing circuitry and a computer readable storage medium comprising instructions that, when executed by the processing circuitry, cause the controller to: receive a setpoint and a time of interest indicating a time in the future when the setpoint is to be reached and obtain a first data set comprising a plurality of lag values, the plurality of lag values associated with one or more variables related to the HVAC system, each lag value corresponding to a respective time within a lag time period, the lag time period beginning prior to the current time. The computer readable storage medium further comprising instructions that, when executed by the processing circuitry, cause the controller to select a second data set comprising a subset of the lag values from the first data set, wherein the subset excludes each lag value corresponding to a variance inflation factor exceeding a variability threshold, and determine a predicted condition at the time of interest based at least in part on the lag values in the second data set. The computer readable storage medium further comprising instructions that, when executed by the processing circuitry, cause the controller to determine a schedule for operating heating or cooling components of the HVAC system such that the setpoint is reached by the time of interest, the schedule determined at least in part based on the predicted condition at the time of interest, and communicate one or more signals instructing the HVAC system to operate according to the schedule.

According to another embodiment, a method for a heating, ventilation, and air condition ("HVAC" system, the method including receiving, by a controller, a setpoint and a time of interest indicating a time in the future when the setpoint is to be reached and obtaining, by the controller, a first data set comprising a plurality of lag values, the plurality of lag values associated with one or more variables related to the HVAC system, each lag value corresponding to a respective time within a lag time period, the lag time period beginning prior to the current time. The method further including selecting, by the controller, a second data set comprising a subset of the lag values from the first data set, wherein the subset excludes each lag value corresponding to a variance inflation factor exceeding a variability threshold, and determining, by the controller, a predicted condition at the time of interest based at least in part on the lag values in the second data set. The method further including determining, by the controller, a schedule for operating heating or cooling components of the HVAC system such that the setpoint is reached by the time of interest, the schedule determined at least in part based on the predicted condition at the time of interest, and communicating, by the controller, one or more signals instructing the HVAC system to operate according to the schedule.

According to yet another embodiment, a heating, ventilation, and air condition ("HVAC") system operable to condition an enclosed space, the HVAC system comprising one or more heating components operable to heat the enclosed space when the HVAC system is in a heating mode, one or more cooling components operable to cool the enclosed space when the HVAC system is in a cooling mode, and a controller. The controller including processing circuitry and a computer readable storage medium comprising instructions that, when executed by the processing circuitry, cause the controller to: receive a setpoint and a time of interest indicating a time in the future when the setpoint is to be reached and obtain a first data set comprising a plurality of lag values, the plurality of lag values associated with one or more variables related to the HVAC system, each lag value corresponding to a respective time within a lag time period, the lag time period beginning prior to the current time. The computer readable storage medium including instructions that, when executed by the processing circuitry, further cause the controller to select a second data set comprising a subset of the lag values from the first data set, wherein the subset excludes each lag value corresponding to a variance inflation factor exceeding a variability threshold, and determine a predicted condition at the time of interest based at least in part on the lag values in the second data set. The computer readable storage medium including instructions that, when executed by the processing circuitry, further cause the controller to determine a schedule for operating heating or cooling components of the HVAC system such that the setpoint is reached by the time of interest, the schedule determined at least in part based on the predicted condition at the time of interest, and communicate one or more signals instructing the HVAC system to operate according to the schedule.

Certain embodiments may provide one or more technical advantages. For example, an embodiment of the present disclosure may predict indoor air temperature of an enclosed space at a time of interest. As another example, an embodiment of the present invention may operate an HVAC system based on a predicted indoor air temperature of an enclosed space. In such an embodiment, the HVAC system may be operated in a manner that permits the enclosed space to reach a setpoint by the time of interest. As yet another example, an embodiment of the present invention may predict indoor air temperature based on a dynamic selection of variables having the lowest amount of multi-collinearity. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
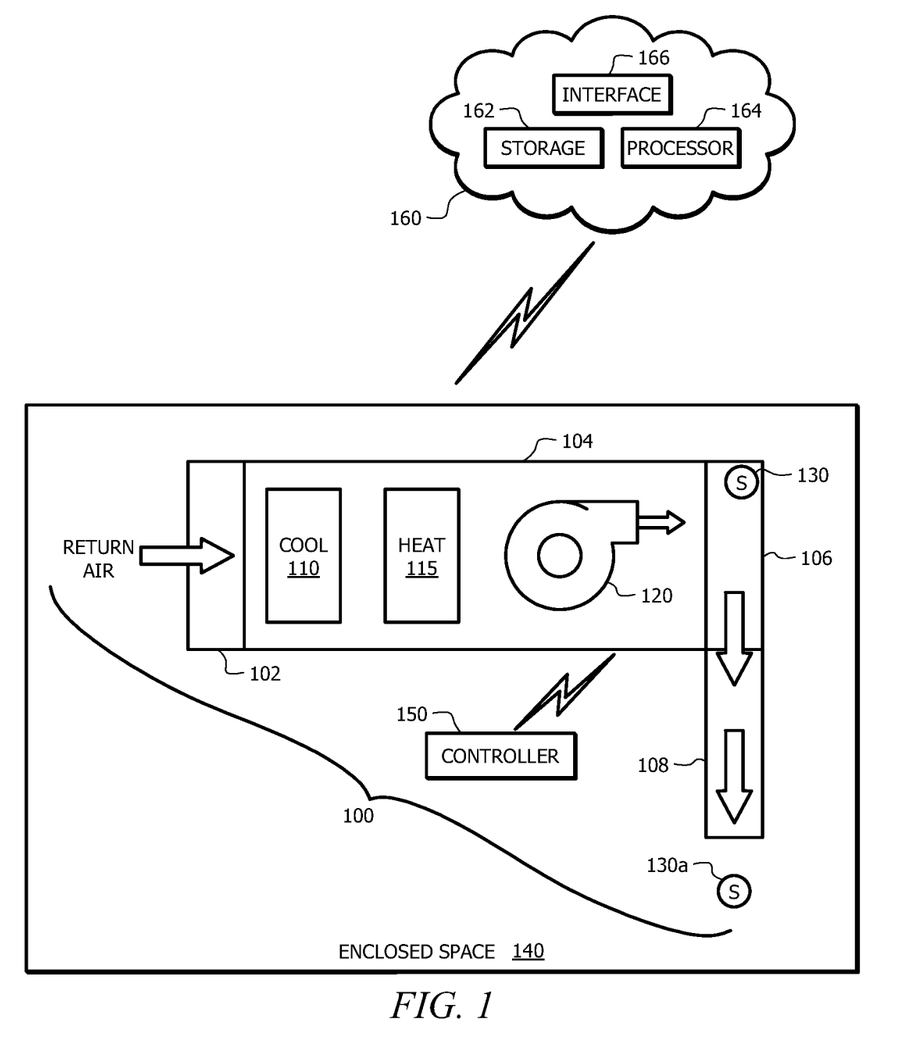
FIG. 1 illustrates an example of a heating, ventilation, and air condition ("HVAC") system operable to provide conditioned air to an enclosed space, according to certain embodiments.
Figure 2A:
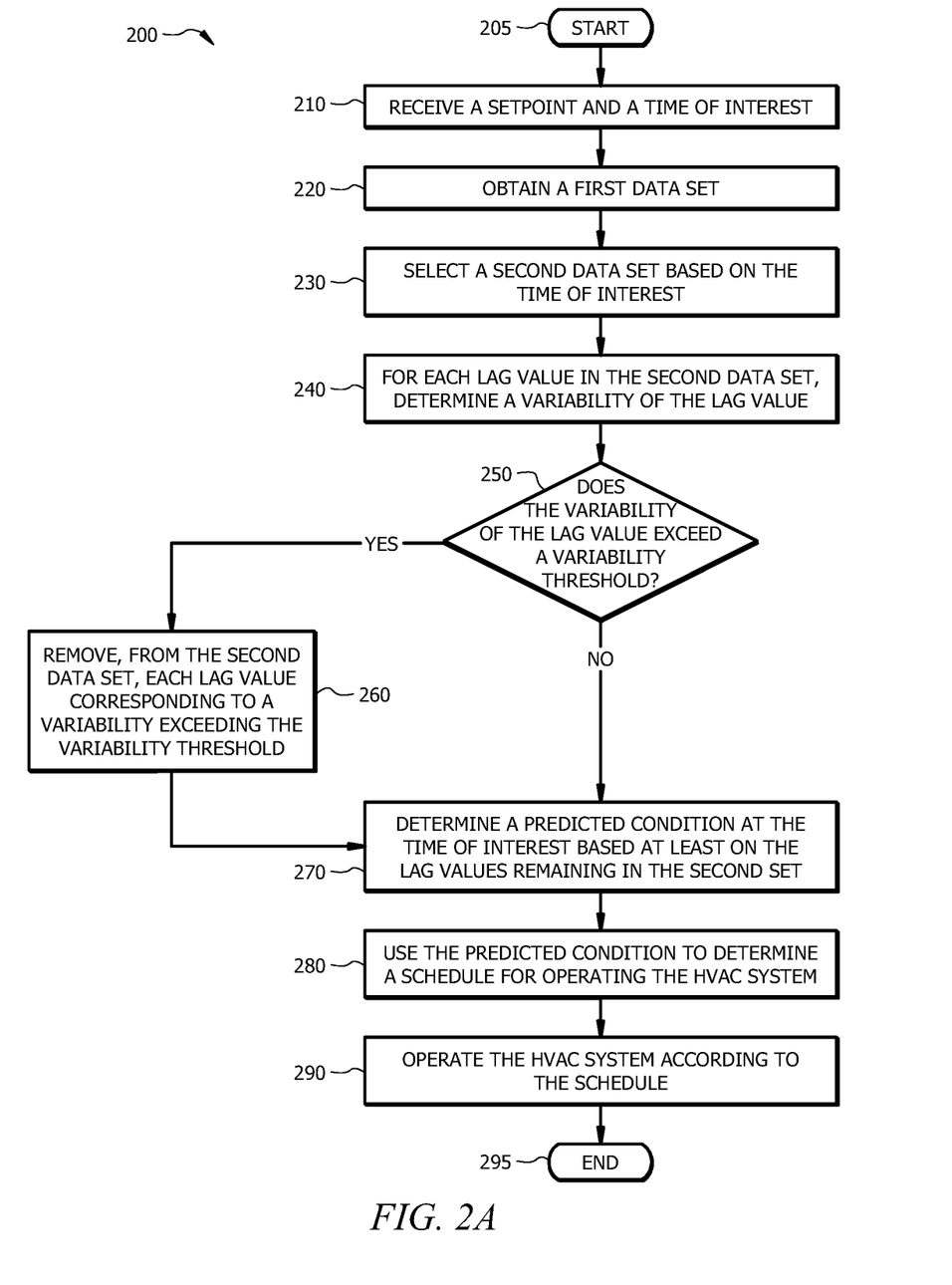
FIG. 2A is a flow chart illustrating a method of operation for at least one controller associated with the HVAC system of FIG. 1, according to certain embodiments.
Figure 2B:
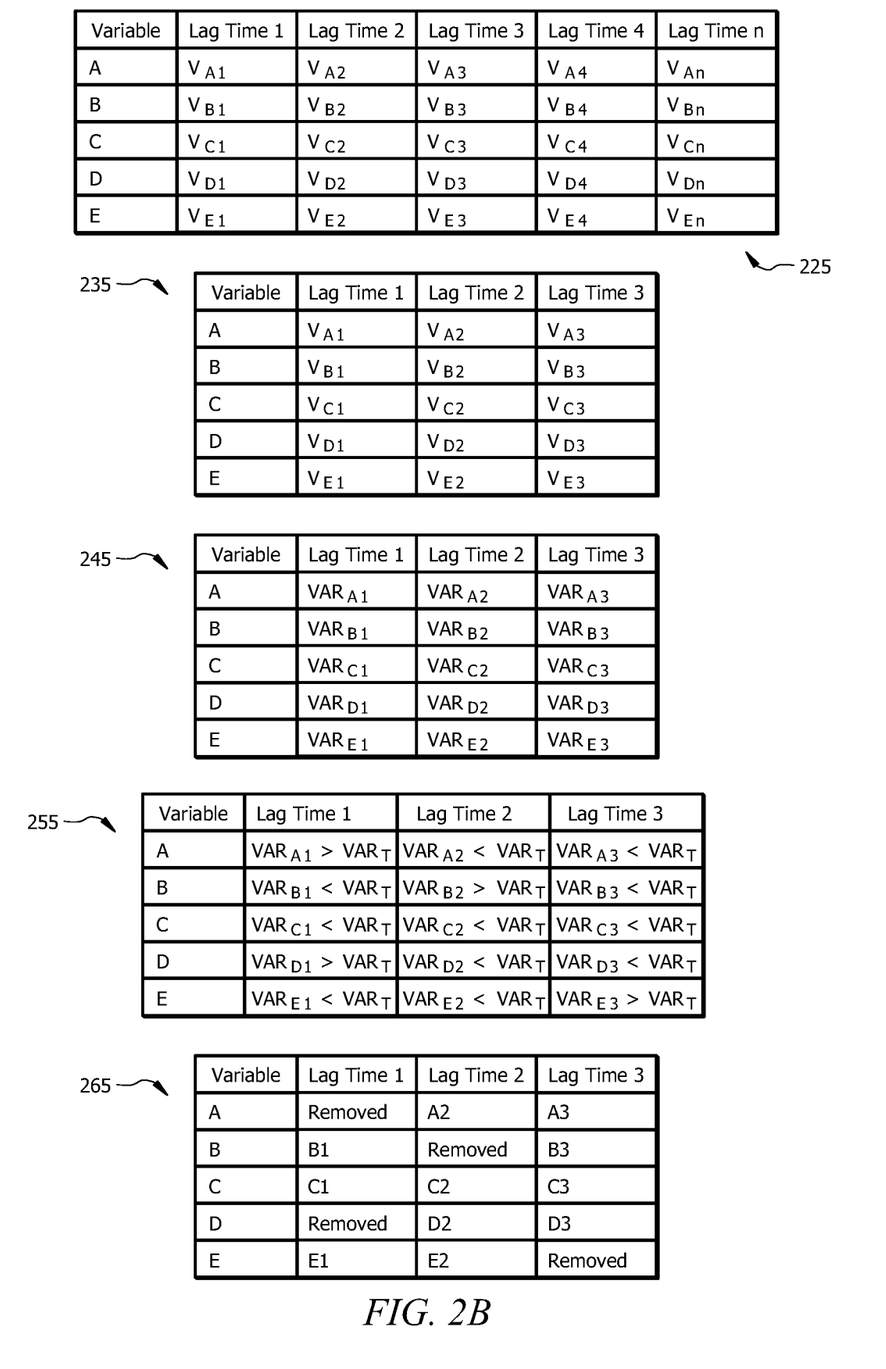
FIG. 2B illustrates examples of data sets generated at various steps of the method of FIG. 2A, according to particular embodiments.
Figure 3:
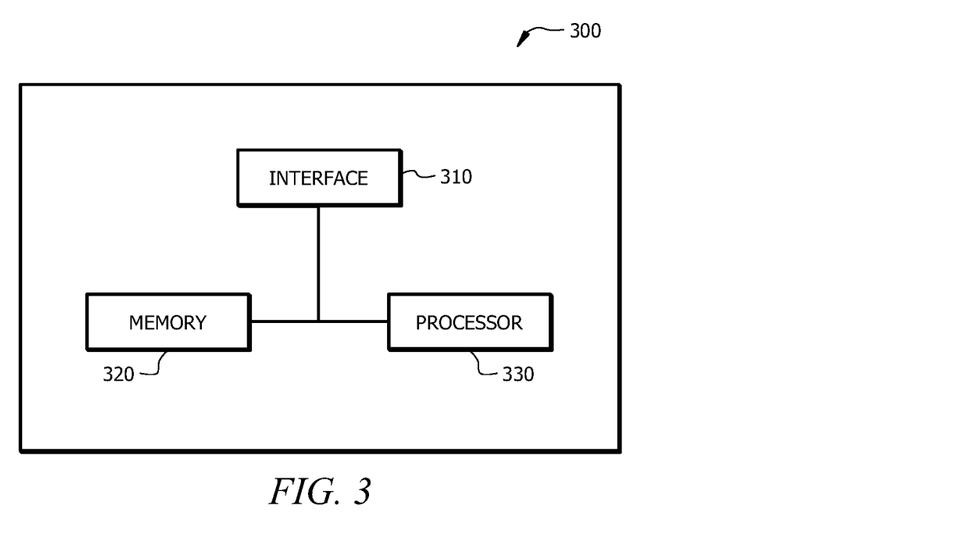
FIG. 3 illustrates an example of a controller for the HVAC system of FIG. 1, according to certain embodiments.

Embodiments of the present disclosure and its advantages are best understood by referring to FIGS. 1 through 3 of the drawings, like numerals being used for like and corresponding parts of the various drawings.

Conventional HVAC systems are typically configured to permit a user to set one or more comfort temperatures for an enclosed space (e.g., a home). A user may set a comfort temperature using a wall-mounted thermostat that further permits the user to indicate a time associated with such comfort temperature. For example, a user may expect to be out of the house from 9 a.m. to 5:30 p.m. but in the house from 5:30 p.m. to 9 a.m. As such, the user may program the thermostat to maintain a temperature of 70° Fahrenheit from 5:30 p.m. to 9 a.m. but reach warmer temperatures (e.g., 78° Fahrenheit) when user is expected to be out of the house. Because the HVAC system may not begin to cool the house to 70° Fahrenheit until 5:30 p.m., the user may be uncomfortably warm in the house until the comfort temperature is reached.

To avoid such problem, the user may program the thermostat to begin cooling prior to the user's expected arrival at the home (e.g., 5:00 p.m.). However, initiating the cooling cycle at a set time may also have various disadvantages. For example, the HVAC system may kick on at 5:00 p.m. (thirty minutes before estimated arrival time) to begin cooling the enclosed space to 70° Fahrenheit when the HVAC system could have reached 70° Fahrenheit in less than seven minutes (e.g., if the temperature of the enclosed space was 72° Fahrenheit at 5:00 p.m.). As such, the HVAC system is operated longer than necessary, thereby wasting energy, costing money, and reducing the operational life of one or more HVAC components. As another example, the HVAC system may kick on at 5:00 (thirty minutes before estimated arrival time) to begin cooling the enclosed space to 70° Fahrenheit but doesn't reach the comfort temperature by the time user arrives home because the HVAC system could not cool the enclosed space fast enough (e.g., if the temperature of the enclosed space is 78°). As such, the user may be uncomfortably warm in the house until the comfort temperature is reached. Accordingly, conventional HVAC systems may be unable to consistently reach a comfort temperature by a particular time while also operating in an efficient manner.

This disclosure recognizes operating an HVAC system based on a predicted indoor air temperature to solve these and other issues with conventional HVAC systems. As will be explained in more detail below, the disclosed system comprises at least one processor configured to dynamically predict indoor air temperature based on the least-correlated variables and to operate an HVAC system based at least in part on the predicted temperature. By dynamically predicting the indoor air temperature based on the least-correlated variables, the at least one processor may determine and implement an operation schedule whereby a comfort temperature is reached at a desired time. As such, the HVAC system is operated in an efficient manner (not operating unnecessarily) and a user isn't subjected to an uncomfortably cold or warm enclosed space. Additionally, in some embodiments, the at least one processor receives information about an occupancy status of the enclosed space and adjusts the HVAC operation schedule based on the occupancy status information. As a result, a user may not have to re-program an HVAC system to accommodate changes in his/her expected arrival times at the house. Instead, the HVAC system may learn about these changes and adjust the HVAC operation schedule based on these learned changes.

FIG. 1 illustrates an example of an HVAC system 100. HVAC system 100 includes a return duct 102, a return plenum 104, a supply duct 106 and a supply plenum 108. Additionally, HVAC system 100 includes conditioning systems for cooling and heating air in an enclosed space 140. The conditioning systems include a cooling system or cooling source 110 and a heating system or heating source 115. The cooling system 110 can include a refrigeration circuit having a compressor system, evaporator coils and condenser coils fluidly coupled together. The cooling system 110 represents a single cooling stage of the HVAC system 100. Given the teachings herein, one skilled in the art will understand that this disclosure also applies to other HVAC embodiments having more than one cooling stage. The heating system 115 can include a gas furnace, electric heating elements, or even a combination thereof. The heating system 115 can also be multi-staged.

The HVAC system 100 also includes an indoor air blower 120, one or more sensors 130, and an HVAC controller 150. Given the teachings herein, one skilled in the art will also understand that HVAC system 100 may include additional components and devices that are not presently illustrated or discussed but are typically included in an HVAC system, such as, a power supply, an expansion valve, etc. Some illustrated components of HVAC system 100 may be contained within a single enclosure (e.g., a cabinet). In one embodiment, HVAC system 100 is a commercial system, such as a rooftop unit. HVAC system 100 can also be a residential system. In some embodiments, the heating and cooling sources for the HVAC system 100 do not operate until activated for conditioning.

The cooling system 110, the heating system 115 and the indoor air blower 120 may be conventional devices that are typically employed in HVAC systems. At least some of the operation of HVAC system 100 can be controlled by the HVAC controller 150 based on inputs from various sensors of the HVAC system 100. For example, the HVAC controller 150 can cause the indoor air blower 120 to move air across the cooling system 110 and into the enclosed space.

Sensors 130 are configured to sense information about the enclosed space and/or components of HVAC system 100. As an example, sensor 130 may include a temperature sensor configured to sense the indoor temperature of an enclosed space. As another example, sensor 130 may include a pressure sensor configured to sense the discharge pressure of a compressor of HVAC system 100. As yet another example, sensor 130 may include an occupancy status sensor configured to sense whether the enclosed space is occupied (e.g., by persons and/or animals). Information sensed by sensors 130 may be sent to controller 150 in some embodiments. In other embodiments, information sensed by sensors 130 may be sent to one or more cloud platforms (e.g., cloud platform 160). User interface 150 is configured to be an interface between a user and HVAC system 100. User interface 150 can be an HVAC device that has a primary function of communicating between HVAC system 100 and the user. In some embodiments, user interface 150 is a non-HVAC device, such as a smart phone, that includes an application which allows communication between a user and HVAC system 100. There may be multiple user interfaces 140 for HVAC system 100. In some embodiments, a temperature sensor 130a and user interface 150 can also be conventional devices. In one embodiment, temperature sensor 130a is a thermostat that also functions as a user interface for HVAC system 100.

HVAC controller 150 may include one or more processors, such as microprocessors, configured to direct the operation of HVAC system 100. Additionally, HVAC controller 150 may include an interface and a memory coupled thereto. The interface may include multiple ports for transmitting and receiving data from at least other components or devices of the HVAC system 100, such as cooling system 110, heating system 115, blower 120, and sensors 130. The interface may also receive input from an operator of HVAC system 100. In some embodiments, the interface may receive one or more setpoints and one or more corresponding time of interests, wherein each time of interest is associated with a particular setpoint. For example, the interface may receive a first setpoint of 70° Fahrenheit associated with a first time of interest of 5:30 p.m. As another example, the interface may receive a second setpoint of 40% humidity associated with a second time of interest 6:30 p.m. The memory section may be a conventional memory that is constructed to store data and computer programs, including data and programs to provide functionality as disclosed herein.

As illustrated in FIG. 1, HVAC controller 150 is coupled to the various components of the HVAC system 100. In some embodiments, the connections therebetween are through a wired-connection. A conventional cable and contacts may be used to couple the HVAC controller 150 to the various components of HVAC system 100 via the controller interface. In other embodiments, a wireless connection may also be employed to provide at least some of the connections. HVAC controller 150 may also be communicably coupled to one or more cloud platforms 160 configured to store and/or execute instructions corresponding to one or more functions disclosed herein.

In one embodiment, the HVAC controller 150 is configured to operate both the cooling system 110 and the heating system 115 of the HVAC system 100 based on a setpoint temperature. As such, HVAC controller 150 and/or cloud platform 160 is configured to determine if either a heat source or a cooling source for the HVAC system is needed. As will be explained in further detail below, controller 150 may operate components of HVAC system 100 according to a determined schedule. In some embodiments, the schedule is determined by controller 150. In other embodiments, the schedule is determined by cloud platform 160 and implemented by controller 150.

As disclosed in FIG. 1, one or more components of HVAC system 100 may be communicably coupled to cloud platform 160. Cloud platform may include, as depicted in FIG. 1, at least one storage device 162, at least one processor 164, and at least one interface 166. In some embodiments, storage device 162 stores computer-readable instructions for executing one or more functions described herein. Processor 164 of cloud platform 160 may execute any, some, or all of the instructions stored to storage device 162. Interface 166 may be configured to send and/or receive information. As an example, interface 166 may receive information from components of HVAC system 100 (e.g., sensors 130, controller 150) in order to determine an operation schedule of HVAC system 100. As another example, interface 166 may send information (e.g., operation schedule of HVAC system 100) to components of HVA system 100 (e.g., to controller 150).

As will be described in more detail below in reference to the method 200 of FIG. 2, this disclosure recognizes an intelligent HVAC system operable to dynamically predict a condition of an enclosed space (e.g., enclosed space 140) at a time of interest. As described herein, HVAC system 100 dynamically predicts the condition at a time of interest based on variables having the least amount of multi-collinearity. In some embodiments, the predicted condition of the enclosed space is an indoor air temperature of the enclosed space. HVAC system 100 may analyze a plurality of values corresponding to one or more variables at one or more times and dynamically select a subset of such values that are predictive of a condition of the enclosed space at the time of interest. By dynamically predicting the indoor air temperature based on variables having the least amount of multi-collinearity, HVAC system 100 may determine and implement an operation schedule whereby a comfort temperature is reached at a desired time. As such, the HVAC system is operated in an efficient manner (not operating unnecessarily) and a user isn't subjected to an uncomfortably cold or warm enclosed space.

As an example, one or more processors associated with HVAC system 100 (e.g., processor of controller 150 and/or processor 166 of cloud computing platform 160) may determine a first data set comprising a plurality of values corresponding to a plurality of variables (e.g., a cooling set point, a heating set point, a cooling demand, a heating demand, an indoor humidity, a total capacity, a sensible capacity, a compressor frequency, an airflow rate, an input voltage, an input current, a simulated power, and/or a measured power) at a plurality of times. The plurality of values may include one or more lag values.

As used herein, lag values refer to one or more values of a variable that occurred at a time in the past, as measured from the time of receipt of the time of interest. In some embodiments, the time of receipt of the time of interest occurs when HVAC system 100 receives the time of interest from the user. As an example, at 7:00 a.m. the user may input a time of interest (e.g., 5:30 p.m.) via a user interface, such as a thermostat display. In this example, the lag values refer to values measured up to 7:00 a.m. In some embodiments, the time of receipt of the time of interest occurs when HVAC system 100 receives the time of interest as an input to prediction logic (i.e., logic that predicts a future condition). Continuing with the previous example, at 7:00 a.m., the user could pre-configure HVAC system 100 to perform the prediction at 2:00 p.m. At 2:00 p.m., the HVAC system retrieves the pre-configured time of interest (e.g., 5:30 p.m.) from memory and inputs the time of interest in the prediction logic. In this example, the lag values refer to variables measured up to 2:00 p.m. (even though the user entered the time of interest at 7:00 a.m.). As another example, HVAC system 100 could be configured to continuously or periodically monitor real-time conditions and determine whether any changes in the conditions warrant re-running the prediction logic (e.g., in order to update the predicted condition), in which case the time of receipt of the time of interest would be based on real-time.

TABLE 1 below provides an identification of lag values in an example wherein $T_R$ indicates the time of receipt of the time of interest:

TABLE 1

| Variable | $T_R$—3 hours | $T_R$—2 hours | $T_R$—1 hour | $T_R$ |
|---|---|---|---|---|
| Cooling Setpoint | 72° F. | 72° F. | 72° F. | 72° F. |
| Indoor Humidity | 45% | 43% | 43% | 47% |
| Outdoor Temperature | 78° F. | 81° F. | 84° F. | 87° F. |
| Indoor Temperature | 72° F. | 73° F. | 75° F. | 77° F. |

In some embodiments, the at least one processor of HVAC system 100 is further configured to determine a second data set including one or more values (e.g., lag values) from the first data set. In some embodiments, the values of the first data set selected for inclusion in the second data set are determined based on the time of interest and/or one or more regression models. As an example, if operator of HVAC system 100 indicates a time of interest ("$T_I$") as 5:30 p.m. when $T_R$ is 12:30 p.m., the at least one processor may determine that difference ("D") between $T_I$ and $T_R$ is five hours. The at least one processor may then determine to select lag values from the first data set beginning at a predetermined time before $T_R$. In some embodiments, the predetermined time is equivalent to D. Taking the above example, the at least one processor may determine to select lag values beginning at 7:30 a.m. ($T_R$–D).

The at least one processor may also select, for inclusion in the second data set, values from the first data set that correspond to a time that is a predetermined interval from the beginning lag time (e.g., 7:30 a.m.). The predetermined interval may be any suitable time. As an example, the predetermined interval may be 1 hour. As another example, the predetermined interval may be two hours. As yet another example, the predetermined interval may be equivalent to D.

Taking one-hour intervals as an example, the at least one processor may select, for inclusion in the second data set, lag values corresponding to one-hour intervals before the beginning lag time (e.g., 7:30 a.m.). In some embodiments, lag values corresponding to the plurality of variables are only stored for a predetermined time period. In such embodiments, any, some, or all of the stored lag values in the first data set corresponding to the appropriate interval may be selected for inclusion in the second data set. For example, if lag values are stored for every minute for each variable up to 12 hours, the at least one processor may select the lag values corresponding to each variable at 6:30 a.m., 5:30 a.m., 4:30 a.m., 3:30 a.m., 2:30 a.m., 1:30 a.m., and 12:30 a.m. Although this disclosure provides a specific example of storing lag values for six hours, lag values may be stored for any appropriate time (e.g., 24 hours, 26 hours, 48 hours).

The at least one processor may further reduce the second data set by performing one or more linear regressions on the values in the data sets (e.g., first data set, second data set). In some embodiments, the at least one processor performs an ordinary least squares (OLS) linear regression on the values of the second data set.

In some embodiments, the at least one processor further reduces the second data set by determining one or more variance inflation factor of the lag values in the second data set. Once the variance inflation factor for each value of the second data set is determined, the at least one processor may further identify each variance inflation factor corresponding to a value in second data set that exceeds a variability threshold ("$V_T$"). In some embodiments, the at least one processor removes, from the second data set, each value in second data set corresponding to an identified variance inflation factor exceeding $V_T$. In such embodiments, the second data set comprises a reduced subset of values that were originally present in the first data set. In some embodiments, the variance inflation factor determination and the removal steps are performed one or more times such that no remaining values in the second data set comprise variabilities that exceed $V_T$. The remaining subset of values represent the HVAC variables having the least amount of multicollinearity (also referred to herein as "least-correlated variables"). The at least one processor may then determine a predicted condition (e.g., a predicted indoor air temperature) associated with the enclosed space based at least on the values of these least-correlated HVAC variables (i.e., the values remaining in the second data set). As stated above, the at least one processor may further determine an operation schedule based in part on the predicted condition and operate HVAC system 100 in a manner that implements the determined operation schedule.

In some embodiments, the at least one processor also receives information (e.g., via sensors 130) about an occupancy status of the enclosed space. The at least one processor may further adjust the HVAC operation schedule based on the occupancy status information. For example, HVAC system 100 may learn over a period of five days that enclosed space 140 is not occupied from 9:00 a.m. to 7:00 p.m. even though it had previously received information (e.g., via user input) that enclosed space 140 should be 70° F. at 5:30 p.m. In such example, HVAC system 100 may adjust the operation schedule to reach 70° F. by 7:00 p.m. rather than 5:30 p.m. because doing otherwise would be wasteful and/or inefficient. In addition to experiencing energy and cost benefits, an operator may save time by not having to reprogram HVAC system to accommodate lifestyle changes. Instead, HVAC system 100 may learn about these changes and adjust the HVAC operation schedule based on these learned changes. Although this disclosure provides an example learning period of five days, this disclosure recognizes that learning period may comprise any suitable time period (e.g., 24 hours, 48 hours, seven days, thirty days).

FIG. 2 illustrates a method of operation for HVAC system 100. In some embodiments, the method 200 may be implemented by a controller of HVAC system (e.g., controller 150 of FIG. 1). In some embodiments, method 200 is stored on a computer readable medium, such as a memory of controller 150 (e.g., memory 320 of FIG. 3), as a series of operating instructions that direct the operation of a processor (e.g., processor 330 of FIG. 3). In other embodiments, method 300 is implement using components of cloud computing platform 160 (e.g., storage 162 and processor 164). In some embodiments, the method 200 begins in step 205 and continues to step 210.

At step 210, at least one processor (e.g., processor 330) receives a setpoint and a time of interest. The setpoint and/or time of interest may, in some embodiments, be received from an operator of HVAC system 100 via user input. The received setpoint may indicate any desired value of a particular HVAC variable. For example, the received setpoint may indicate an indoor temperature of 72° Fahrenheit. As another example, the received setpoint may indicate an indoor humidity of 40% relative humidity. The time of interest may indicate a time in the future at which the setpoint is to be reached. Taking the example above, an HVAC operator may program, at 12:00 p.m. on Jan. 1, 2018, HVAC system 100 to reach 72° Fahrenheit by 6:00 p.m. on Jan. 1, 2018. In such example, 72° Fahrenheit is the setpoint and 6:00 p.m. on Jan. 1, 2018 is the time of interest. For ease of understanding, this example will be used to describe the additional steps of method 200. In some embodiments, method 200 proceeds to a step 220 after receiving the setpoint and time of interest.

At step 220, the at least one processor obtains a first data set comprising a plurality of lag values. FIG. 2B includes an example of first data set (e.g., first data set 225). As depicted in FIG. 2B, first data set 225 may include a plurality of lag values (e.g., values A1, B1, C1, D1, E1, A2, B2, C2, D2, E2, A3, B3, C3, D3, E3, A4, B4, C4, D4, E4, An, Bn, Cn, Dn, and En indicated in table 225 as $V_x$) that each correspond to both a variable (e.g., variables A-E) and a lag time (e.g., Lag Time 1, Lag Time 2, Lag Time 3, Lag Time 4, Lag Time n). A lag value may be associated with one or more of the following HVAC variables: a cooling set point, a heating set point, a cooling demand, a heating demand, an indoor humidity, a total capacity, a sensible capacity, a compressor frequency, an airflow rate, an input voltage, an input current, a simulated power, and/or a measured power. The lag times corresponding to the lag values may be any suitable time. One or more lag values in the first data set may be determined based on sensed data (e.g., from sensors 130). One or more lag values may also be determined based on calculations (e.g., the total capacity of HVAC system 100), programmed data (e.g., a configured setpoint) and/or learned data (e.g., occupied status of enclosed space, learned from external source (e.g., forecasting source)). In some embodiments, method 200 proceeds to a step 230 after obtaining the first data set.

At step 230, the at least one processor dynamically selects a second data set based at least in part on the time of interest. In some embodiments, the at least one processor selects the second data set by calculating the duration of time between the time of interest and the current time (e.g., time when the setpoint is received), and determining, based on the calculated duration, one or more lag values for the second set of data. An example algorithm for the at least one processor may be: (1) calculate a duration between a time of interest and the current time; (2) determine a lag value start time based on the calculated duration and the current time; (3) select one or more lag values of the first data set, the selected lag values corresponding to either the lag value start time or a time preceding the lag value start time at one or more predetermined intervals (e.g., one-hour intervals, four-hour intervals, etc.). A real-world example is provided for hereinafter for better understanding.

The at least one processor calculates the duration of time between 12:00 p.m. on Jan. 1, 2018 (current time) and 6:00 p.m. on Jan. 1, 2018 (time of interest) as six (6) hours. Based on the calculated duration, the at least one processor determines a lag value start time of 6:00 AM (six hours before current time). In response to determining the lag value start time, the at least one processor dynamically selects lag values comprising the second data set by identifying lag values corresponding to the lag value start time (6:00 a.m.) and lag values corresponding to a time preceding the lag value start time at one or more predetermined intervals (e.g., one-hour interval). Using the example of the one-hour interval, the at least one processor may determine lag values corresponding to the following lag times: 6:00 a.m. on 2018, 5:00 a.m. on Jan. 1, 2018, 4:00 a.m. on Jan. 1, 2018, 3:00 a.m. on Jan. 1, 2018, 2:00 a.m. on Jan. 1, 2018, 1:00 a.m. on Jan. 1, 2018, 12:00 a.m. on Jan. 1, 2018. In some embodiments, the at least one processor determines a predetermined number of lag times and/or lag times within a predetermined time from the time of interest. As an example, the at least one processor may determine 28 lag times at one-hour intervals beginning at 6:00 a.m. on Jan. 1, 2018 and as such includes lag values for each hour between 6:00 a.m. on Jan. 1, 2018 and 3:00 a.m. on Dec. 31, 2017. In some embodiments, the second data set may comprise a subset of the lag values from the first data set.

An example of the second data set is illustrated in FIG. 2B (e.g., second data set 235). As illustrated in FIG. 2B, second data set 235 comprises values A–$E_{1-3}$ but not values A-En of first data set 225. Second data set 235 illustrates that Lag Time 3 is the lag value start time and that Lag Times 1 and 2 are times preceding Lag Time 3 at a predetermined interval. As stated above, predetermined interval may be any suitable interval such as 2-hours. Thus, Lag Time 2 may be 2 hours before Lag Time 3 and Lag Time 1 may be 4 hours before Lag Time 3. Second data set 235 includes times corresponding to lag value start time Lag Time 3 (e.g., values A3, B3, C3, D3, and E3) and times corresponding to times preceding the lag value start time at predetermined intervals (values A1, B1, C1, D1, E1, A2, B2, C2, D2, and E2).

In some embodiments, second data set 235 is further determined based on the application of one or more regression models. For example, the at least one processor may perform a 10-fold cross validated LASSO regression (e.g., L1-Norm Regularized regression model) on second data set 235 to modify or further narrow second data set 235. As another example, the at least one processor may subsequently apply an L2 regression model on the modified second data set 235 for a further modified second data set 235. For ease of understanding, second data set 235 is referred to herein as second data set 235 regardless of whether it has been modified or narrowed by one or more regression models. In some embodiments, the method 200 proceeds to a step 240 after second data set 235 is selected.

At step 240, the at least one processor determines, for each lag value in the second data set, a variance inflation factor for the lag value. As stated above, the second data set 235 may, depending on whether one or more regression models have been applied, actually be a modified version of second data set 235 illustrated in FIG. 2B. Table 245 of FIG. 2B illustrates a variance inflation factor (VAR) corresponding to each lag value (A–$E_{1-3}$). As an example, the variance inflation factor of lag value A1 is expressed as $VAR_{A1}$ and the variance inflation factor of lag value $E_3$ is expressed as $VAR_{E3}$. In some embodiments, the method 200 proceeds to a step 240 after determining a variance inflation factor for each lag value in second data set 235.

At step 250, the at least one processor determines whether the variance inflation factor of each lag value exceeds a variability threshold ($V_T$). The variability threshold ($V_T$) may be any suitable number. In some instances, the variability threshold corresponds to a variance inflation factor of 5. Table 255 of FIG. 2B illustrates the determination of step 250. For example, as depicted in Table 255, $VAR_{A1}$, $VAR_{C1}$, $VAR_{B2}$, and $VAR_{E3}$ exceed the variability threshold ($V_T$). As also depicted in Table 255, $VAR_{B1}$, $VAR_{C1}$, $VAR_{E1}$, $VAR_{A2}$, $VAR_{C2}$, $VAR_{D2}$, $VAR_{E2}$, $VAR_{A3}$, $VAR_{B3}$, $VAR_{C3}$, and $VAR_{d3}$ do not exceed the variability threshold ($V_T$). Although FIG. 2B illustrates an embodiment that uses the same variability threshold ($V_T$) for each variable A-E, other embodiments can use different variability thresholds ($V_T$) for different variables. If at step 250 it is determined that the variance inflation factor of a lag value exceeds the variability threshold, the method proceeds to a step 260. Alternatively, if at step 250 it is determined that the variance inflation factor of a lag value does not exceed the variability threshold, the method proceeds to a step 270.

At step 260, the at least one processor removes from second data set 235, each lag value corresponding to a variance inflation factor exceeding the variability threshold ($V_T$). Taking the example of table 255 above, it was determined at step 250 that $VAR_{A1}$, $VAR_{D1}$, $VAR_{B2}$, and $VAR_{E3}$ exceed the variability threshold ($V_T$). As such, at step 260 the at least one processor removes lag values A1, D1, B2, and E3 from second data set 235. Accordingly, as illustrated in table 265 of FIG. 2B, second data set 235 includes lag values B1, C1, E1, A2, C2, D2, E2, A3, B3, C3, and D3. In some embodiments, the method repeats steps 230-260 one or more times until all lag values corresponding to a variance inflation factor exceeding the variability threshold have been removed from second data set 235. As an example, the method may run a first phase identifying lag values according to a one-hour time interval and a second phase identifying lag values according to a two-hour interval. During the second phase operation, lag values may be removed from second data set 235 that were not removed during the first phase. As described above, second data set 235 may be further modified by the application of one or more regression models and the variance inflation factor of each lag value in second data set 235 may be determined based on the modified second data set 235. After removing, from second data set 235, all lag values corresponding to a variance inflation factor exceeding the variability threshold, the method 200 may proceed to a step 270.

At step 270, the at least one processor determines a predicted condition at the time of interest based at least on the lag values remaining in second data set 235. In some embodiments, the predicted condition is a temperature of the enclosed space at the time of interest. In other embodiments, the predicted condition is a humidity of the enclosed space at the time of interest. In yet other embodiments, the predicted condition is a heating and/or cooling energy consumption at the time of interest. In some embodiments, the method 200 proceeds to as step 280 after the predicted condition is determined.

At step 280, the at least one processor determines a schedule for operating HVAC system 100 using the predicted condition. In some embodiments, the schedule is also determined based on the setpoint received at step 210. For example, if at step 270, the at least one processor determines that the predicted condition is a temperature of 75° Fahrenheit and the setpoint received at step 210 was 72° Fahrenheit, the at least one processor may determine a schedule that will permit the enclosed space to reach the setpoint by the time of interest. In some embodiments, the method 200 proceeds to a step 290.

At step 290, the at least one processor operates HVAC system 100 according to the schedule determined at step 280. In some embodiments, operating HVAC system 100 according to the determined schedule permits the enclosed space to reach the setpoint at the time of interest. Operating HVAC system 100 may include operating one or more elements of cooling system 110 and/or heating system 115. In some embodiments, controller 150 of HVACY system 100 operate such elements of HVAC system 100. In some embodiments, the method 200 proceeds to an end step 295.

The method 200 may include one or more additional steps in some embodiments. Although this disclosure describes and depicts certain steps of method 200, this disclosure recognizes that method 200 may comprise any suitable step.

FIG. 3 illustrates an example controller 300 of HVAC system 100, according to certain embodiments of the present disclosure. In some embodiments, controller 300 may be an example of controller 150 described herein in relation to FIG. 1. Controller 300 may comprise one or more interfaces 310, memory 320, and one or more processors 330. Interface 310 receives input (e.g., sensor data or system data), sends output (e.g., data, instructions), processes the input and/or output, and/or performs other suitable operation. Interface 310 may comprise hardware and/or software. As an example, interface 310 receives information (e.g., temperature, operation, speed, pressure information) about one or more components of systems 100 (e.g., via sensors).

Memory (or memory unit) 320 stores information. As an example, memory 320 may store method 300. Memory 320 may comprise one or more non-transitory, tangible, computer-readable, and/or computer-executable storage media. Examples of memory 320 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (e.g., a server and/or cloud storage and processing), and/or other computer-readable medium.

Processor 330 may include any suitable combination of hardware and software implemented in one or more modules to execute instructions and manipulate data to perform some or all of the described functions of controller 300. In some embodiments, processor 330 may include, for example, one or more computers, one or more central processing units (CPUs), one or more microprocessors, one or more applications, one or more application specific integrated circuits (ASICs), one or more field programmable gate arrays (FPGAs), and/or other logic.

Although this disclosure describes and depicts predicting conditions associated with enclosed spaces based on identifying the least-correlated variables, this disclosure recognizes that other variables may be predicted based on a similar variable analysis. For example, heating and/or cooling energy consumption may be predicted and/or forecasted based on least-correlated variables. Although this disclosure describes the prediction of certain variables (e.g., temperature, energy consumption), this disclosure recognizes that any variable having a multi-collinearity problem may be predicted using the systems and methods described herein.

Modifications, additions, or omissions may be made to the systems, apparatuses, and methods described herein without departing from the scope of the disclosure. The components of the systems and apparatuses may be integrated or separated. Moreover, the operations of the systems and apparatuses may be performed by more, fewer, or other components. For example, refrigeration system 100 may include any suitable number of compressors, condensers, condenser fans, evaporators, valves, sensors, controllers, and so on, as performance demands dictate. One skilled in the art will also understand that refrigeration system 100 can include other components that are not illustrated but are typically included with refrigeration systems. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure.

The invention claimed is:

1. A controller for a heating, ventilation, and air condition ("HVAC") system, the controller comprising processing circuitry and a computer readable storage medium comprising instructions that, when executed by the processing circuitry, cause the controller to:
   receive, at a current time, a setpoint and a time of interest indicating a time in the future when the setpoint is to be reached;
   obtain a first data set comprising a plurality of lag values, the plurality of lag values associated with one or more variables related to the HVAC system, each lag value corresponding to a respective time within a lag time period, the lag time period beginning prior to the current time;
   calculate a duration between the time of interest and the current time;
   determine a lag value start time based on the calculated duration and the current time;
   select a second data set comprising a subset of the lag values from the first data set, wherein the subset includes lag values for a time preceding the lag value start time and excludes each lag value corresponding to a variance inflation factor exceeding a variability threshold;
   determine a predicted condition at the time of interest based at least in part on the lag values in the second data set;
   determine a schedule for operating heating or cooling components of the HVAC system such that the setpoint is reached by the time of interest, the schedule determined at least in part based on the predicted condition at the time of interest; and
   communicate one or more signals instructing the HVAC system to operate according to the schedule.

2. The controller of claim 1, wherein the schedule includes a start time for switching from an unoccupied configuration to an occupied configuration, the start time determined at least in part based on the predicted condition at the time of interest.

3. The controller of claim 1, wherein the subset of the lag values included in the second data set are dynamically selected at least in part based on the received time of interest.

4. The controller of claim 1, wherein the controller is configured to perform an ordinary least squares (OLS) linear regression on the second data set.

5. The controller of claim 1, wherein:
   the controller is further configured to perform a 10-fold cross validation technique on the second data set.

6. The controller of claim 5, wherein the 10-fold cross validation technique is an L1-Norm Regularized regression model.

7. The controller of claim 1, wherein the lag time period is no more than 26 hours.

8. The controller of claim 1, wherein the processing circuitry is deployed on a cloud platform.

9. The controller of claim 1, wherein the one or variables associated with the HVAC system comprise one or more of:
   an indoor temperature;
   a cooling set point;
   a heating set point;
   a cooling demand;
   a heating demand;
   an indoor humidity;
   a total capacity;
   a sensible capacity;
   a compressor frequency;
   an airflow rate;
   an input voltage;
   an input current;
   a simulated power; and
   a measured power.

10. A method for a heating, ventilation, and air condition ("HVAC" system, the method comprising:
    receiving, by a controller, a setpoint and a time of interest indicating a time in the future when the setpoint is to be reached;
    obtaining, by the controller, a first data set comprising a plurality of lag values, the plurality of lag values associated with one or more variables related to the HVAC system, each lag value corresponding to a respective time within a lag time period, the lag time period beginning prior to the current time;
    calculate a duration between the time of interest and the current time;
    determine a lag value start time based on the calculated duration and the current time;
    selecting, by the controller, a second data set comprising a subset of the lag values from the first data set, wherein the subset includes lag values for a time preceding the lag value start time and excludes each lag values corresponding to a variance inflation factor exceeding a variability threshold;
    determining, by the controller, a predicted condition at the time of interest based at least in part on the lag values in the second data set;
    determining, by the controller, a schedule for operating heating or cooling components of the HVAC system such that the setpoint is reached by the time of interest, the schedule determined at least in part based on the predicted condition at the time of interest; and
    communicating, by the controller, one or more signals instructing the HVAC system to operate according to the schedule.

11. The method of claim 10, wherein the schedule includes a start time for switching from an unoccupied configuration to an occupied configuration, the start time determined at least in part based on the predicted condition at the time of interest.

12. The method of claim 10, wherein the subset of the lag values included in the second data set are dynamically selected at least in part based on the received time of interest.

13. The method of claim 10, further comprising applying an ordinary least squares (OLS) linear regression to the second data set.

14. The method of claim 10, further comprising applying a 10-fold cross validation technique to the second data set.

15. The method of claim 14, wherein the 10-fold cross validation technique is an L1-Norm Regularized regression model.

16. The method of claim 10, wherein the lag time period is no more than 26 hours.

17. The method of claim 10, wherein the one or variables associated with the HVAC system comprise one or more of:
    an indoor temperature;
    a cooling set point;
    a heating set point;

a cooling demand;
a heating demand;
an indoor humidity;
a total capacity;
a sensible capacity;
a compressor frequency;
an airflow rate;
an input voltage;
an input current;
a simulated power; and
a measured power.

18. A heating, ventilation, and air condition ("HVAC") system operable to condition an enclosed space, the HVAC system comprising:
   one or more heating components operable to heat the enclosed space when the HVAC system is in a heating mode;
   one or more cooling components operable to cool the enclosed space when the HVAC system is in a cooling mode;
   a controller comprising processing circuitry and a computer readable storage medium comprising instructions that, when executed by the processing circuitry, cause the controller to:
      receive, at a current time, a setpoint and a time of interest indicating a time in the future when the setpoint is to be reached;
      obtain a first data set comprising a plurality of lag values, the plurality of lag values associated with one or more variables related to the HVAC system, each lag value corresponding to a respective time within a lag time period, the lag time period beginning prior to the current time;
      calculate a duration between the time of interest and the current time;
      determine a lag value start time based on the calculated duration and the current time;
      select a second data set comprising a subset of the lag values from the first data set, wherein the subset includes lag values for a time preceding the lag value start time and excludes each lag value corresponding to a variance inflation factor exceeding a variability threshold;
      determine a predicted condition at the time of interest based at least in part on the lag values in the second data set;
      determine a schedule for operating heating or cooling components of the HVAC system such that the setpoint is reached by the time of interest, the schedule determined at least in part based on the predicted condition at the time of interest; and
      communicate one or more signals instructing the HVAC system to operate according to the schedule.

19. The HVAC system of claim 18, wherein the schedule includes a start time for switching from an unoccupied configuration to an occupied configuration, the start time determined at least in part based on the predicted condition at the time of interest.

20. The HVAC system of claim 18, wherein the subset of the lag values included in the second data set are dynamically selected at least in part based on the received time of interest.

* * * * *